(12) United States Patent
Sandler et al.

(10) Patent No.: US 8,542,347 B2
(45) Date of Patent: Sep. 24, 2013

(54) SUPER RESOLUTION TELESCOPE

(75) Inventors: Dave Sandler, San Diego, CA (US); Brett Spivey, Carlsbad, CA (US); Louis Cuellar, Albuquerque, NM (US); Paul Fairchild, San Diego, CA (US)

(73) Assignee: Trex Enterprises Corp., San Diego, CA (US)

( * ) Notice: Subject to any disclaimer, the term of this patent is extended or adjusted under 35 U.S.C. 154(b) by 0 days.

(21) Appl. No.: 12/381,021

(22) Filed: Mar. 5, 2009

(65) Prior Publication Data

US 2012/0105822 A1  May 3, 2012

(51) Int. Cl.
  *G01C 3/08* (2006.01)
  *G01B 9/02* (2006.01)
(52) U.S. Cl.
  USPC .......................................... 356/4.1; 356/486
(58) Field of Classification Search
  USPC .............. 356/4.09, 4.1, 484, 486; 250/201.9, 250/203.1, 203.3; 359/399
  See application file for complete search history.

(56) References Cited

U.S. PATENT DOCUMENTS

| | | | | |
|---|---|---|---|---|
| 5,969,334 A * | 10/1999 | Hutchin | .................... | 250/201.9 |
| 8,058,598 B2 * | 11/2011 | Sandler et al. | ............. | 250/201.9 |
| 2008/0218851 A1 * | 9/2008 | Chen et al. | .................... | 359/419 |
| 2008/0259447 A1 * | 10/2008 | Oppenheimer | ............... | 359/399 |
| 2010/0110208 A1 * | 5/2010 | Gerwe | ....................... | 348/222.1 |

* cited by examiner

*Primary Examiner* — Michael A Lyons
(74) *Attorney, Agent, or Firm* — John R. Ross

(57) ABSTRACT

A super-resolution telescope. A target is illuminated with at least three laser beams, each beam having a slightly different frequency so as to produce an illumination pattern comprised of several sets of straight interference fringes which sweep across the target. The frequencies of the illumination beams are chosen so that each pair of beams has a unique beat frequency, and the corresponding fringe pattern for each pair sweeps over the target at a unique speed. By collecting a series of images, and demodulating them at the various beat frequencies, the downshifted spatial frequencies can be identified, correctly up-shifted, and fitted together with a set of special Fourier transform based algorithms to reconstruct high-resolution images. Applicants have performed laboratory experiments that this invention can provide resolution substantially better than diffraction limited resolution.

9 Claims, 22 Drawing Sheets

Laser Specs

| | |
|---|---|
| Wavelength | ~532±30 nm |
| Bandwidth over 5 μsec | ≥10 GHz |
| Average Power Output per Beam | 35 W |
| Number of Laser Beams | 3 |
| Pulse Duration | 0.5±0.4 nsec |
| Rep Rate | 100±50 kHz |
| Beam Quality Factor $M^2$ | <1.5 |
| Linear Polarization Extinction Ratio | >95% |
| Maximum Mismatch of Optical Path | 0.3mm |

FIG. 8A

FD: Frequency Doubling

AOM: 1064±16 nm, max power >1w, modulation 50-500MHz

| Wavelength | 1064±16 nm |
|---|---|
| Bandwidth over 5 μsec | ≥10 GHz |
| Average Power Output | ≥ 10 mW |
| Pulse Duration | 0.5±0.4 nsec |
| Rep Rate | 100±50 kHz |
| Beam Quality Factor $M^2$ | <1.5 |
| Linear Polarization Extinction Ratio | >95% |

MO selection:
A Q-switched pulse laser, a mode-locked pulse laser, a disk laser, or a CW laser with amplitude modulation

FIG. 8D

| Wavelength | 1064±16 nm |
|---|---|
| Average Power Output per Beam | >60 W |
| Pulse Duration | >0.5±0.4 nsec |
| Rep Rate | 100±50 kHz |
| Beam Quality Factor $M^2$ | <1.3 |
| Linear Polarization Extinction Ratio | >95% |

FIG. 8F

| | |
|---|---|
| Fundamental Wavelength | 1064±16 nm |
| Output Wavelength | 532±30 nm |
| Average Power Output per Beam | 35 W |
| Pulse Duration | >0.5±0.4 nsec |
| Rep Rate | 100±50 kHz |
| Beam Quality Factor M² | <1.3 |
| Linear Polarization Extinction Ratio | >95% |

FIG. 8G

Fourier Description of Images with Stripes

Image Description in x-y Plane

Image with modulated stripes

$$I(\vec{x}) \cdot \left(1 + \cos(\vec{k}_s \cdot \vec{x} + \omega \cdot t)\right)$$

↙ Interference pattern produced by 2 lasers

Image with stripes in telescope

$$\left[I(\vec{x}) \cdot \left(1 + \cos(\vec{k}_s \cdot \vec{x} + \omega \cdot t)\right)\right] \otimes T(\vec{x})$$

- Image with stripes
- Convolution symbol
- Blur due to diffraction

Image Description in Fourier Plane

FT of image with stripes

$$I(\vec{k}) \otimes \left(\delta(\vec{k}) + \frac{1}{2}\delta(\vec{k}-\vec{k}_s) \cdot e^{-1i \cdot \omega \cdot t} + \frac{1}{2}\delta(\vec{k}+\vec{k}_s) \cdot e^{1i \cdot \omega \cdot t}\right)$$

↖ FT of stripes is 3 points

Can rewrite as:

$$I(\vec{k}) + \frac{1}{2}I(\vec{k}-\vec{k}_s) \cdot e^{-1i \cdot \omega \cdot t} + \frac{1}{2}I(\vec{k}+\vec{k}_s) \cdot e^{1i \cdot \omega \cdot t}$$

FT of image with stripes in telescope

$$\left(I(\vec{k}) + \frac{1}{2}I(\vec{k}-\vec{k}_s) \cdot e^{-1i \cdot \omega \cdot t} + \frac{1}{2}I(\vec{k}+\vec{k}_s) \cdot e^{1i \cdot \omega \cdot t}\right) \cdot T(\vec{k})$$

Just multiply by telescope MTF

Separate frequency encoded components:

$$I(\vec{k}) \cdot T(\vec{k})$$

$$\frac{1}{2} I(\vec{k}-\vec{k}_s) \cdot T(\vec{k}) = \frac{1}{2} I(\vec{k}') \cdot T(\vec{k}'+\vec{k}_s)$$

$$\frac{1}{2} I(\vec{k}+\vec{k}_s) \cdot T(\vec{k}) = \frac{1}{2} I(\vec{k}'') \cdot T(\vec{k}''-\vec{k}_s)$$

Change k for each component to get system MTF components

FIG. 9B

The Fourier data is symmetrical through the origin:

Each baseline produces data on each side of the origin – 3 baselines produce 6 offsets With 3 lasers, there are 3 relative pairs of laser baselines The spatial frequencies are measured out to the sum D/AR + S/AR

D/AR + S/AR

Unfolded Baselines:

3 Lasers:

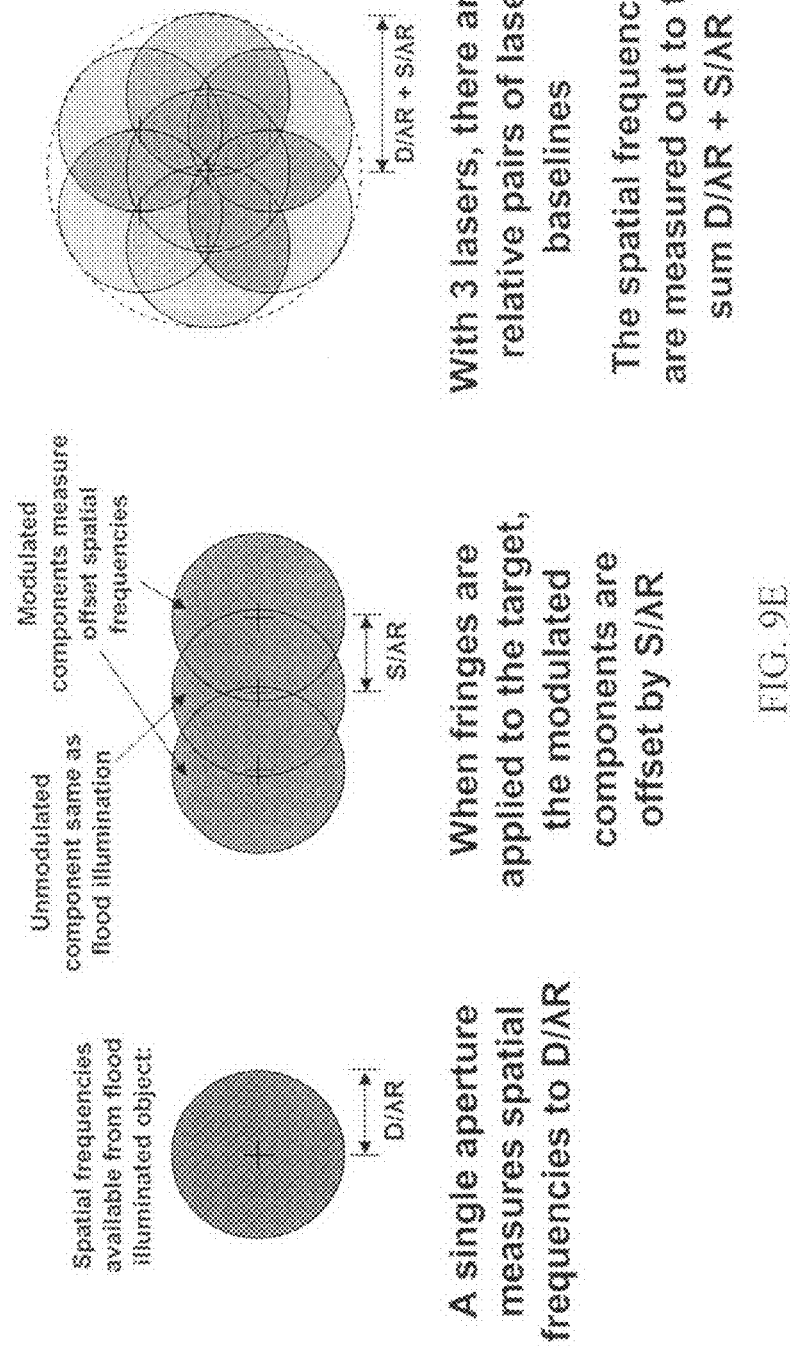

Phase Recovery

- The relative phases of the broadcast lasers are assumed to be unknown
- We use the high degree of redundancy in the measurement to fill in unknown phases

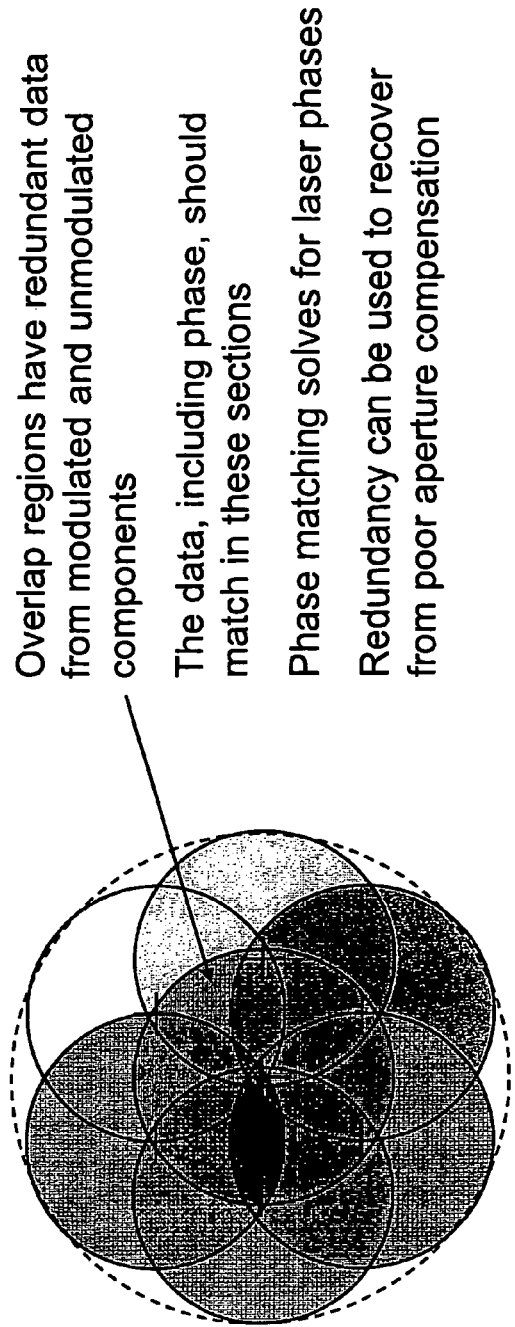

- Overlap regions have redundant data from modulated and unmodulated components
- The data, including phase, should match in these sections
- Phase matching solves for laser phases
- Redundancy can be used to recover from poor aperture compensation

FIG. 9F

3D Imaging

- Laser micropulsing + time resolved detector → 3D Hi Res images

- Trex has shown recently that 3D works within the conventional FT algorithm

- Somewhat surprisingly, 3D actually reduces laser power requirements
  - Due to the properties of the phase reconstruction process

FIG. 9G

SUPER RESOLUTION TELESCOPE

FEDERALLY SPONSORED RESEARCH

The present invention was made in the course of work performed under Contracts No. FA9451-04-D-0300 with the Defense Advanced Research Projects Agency and the United States Air Force and the United States Government has rights in the invention.

FIELD OF INVENTION

The present invention relates to telescopes and in particular to Fourier telescopic imaging systems.

BACKGROUND OF THE INVENTION

Fourier Telescopy

Fourier telescopy is an imaging technique that uses multiple beams from spatially separated transmitters to illuminate a distant object. A large number of wide aperture telescopes (referred to as "light buckets") are used to detect the light reflected from the object with sufficient signal-to-noise ratio, but no attempt is made to form an image directly from the collected light. Each beam is shifted relative to the other beams to produce interference between beams at the target. Thus interference patterns are produced on the target. These interference patterns are encoded in the time dependent reflections from the target. The reflected light collected by the light buckets is Fourier transformed into a frequency spectrum as a function of time and this spectrum is correlated with known positions and frequencies of the transmitted beams as a function of time to derive a two dimensional image of the target.

This imaging technique has been studied extensively for use in imaging deep space objects. In prior art system designs, for example, three beams would be transmitted simultaneously in pulses to image a geosynchronous object. It would take many hours to transmit the tens of thousands of pulses needed to construct all of the spatial frequencies needed to form an image of the object. Because the position and orientation of the object would remain essentially constant, this approach seemed feasible. Three illuminating apertures were used in order to eliminate the degrading atmospheric phase aberrations using the well known technique of phase closure, and then the closure phases used to reconstruct the illuminated target image. Previous experiments in both the lab and field have verified that this implementation of the Fourier Telescopy technique to imaging geostationary targets is both viable and robust.

AEOS Telescope

The AEOS (short for Advanced Electro-Optical System) telescope is a 3.67-meter 75 ton telescope situated at the crest of the dormant volcano Haleakala on the Hawaiian Island of Maui. It is owned by the United States Department of Defense and is used for tracking and viewing satellites as well as many scientific purposes. Virtually year-round viewing conditions are possible due to the relatively stable climate. Dry, clean air and minimal scattered light from surface sources enable visibility exceeding 150 km. Based on double star observations, seeing is typically on the order of one second of arc. AEOS can be used simultaneously by many groups or institutions because its light can be channeled through a series of mirrors to seven independent coudé rooms below the telescope. Employing sophisticated sensors that include an adaptive optics system, radiometer, spectrograph, and long-wave infrared imager, the telescope tracks man-made objects in deep space and performs space object identification data collection. AEOS is equipped with an adaptive optics system, the heart of which is a 941-actuator deformable mirror that can change its shape to remove the atmosphere's distorting effects. Other associated equipment includes a 1.6-meter telescope, two 1.2-meter telescopes on a common mount, a 0.8-meter beam director/tracker, and a 0.6-meter laser beam director. The telescopes accommodate a wide variety of sensor systems, including imaging systems, conventional and contrast mode photometers, infrared radiometers, low light level video systems, and acquisition telescopes.

A rough estimate of for diffraction limit for a telescope is:

$$Rs = Ra\lambda/D$$

where Rs is the resolution, Ra is the range, $\lambda$ is the wavelength and D is the aperture diameter. For the AEOS telescope, a range of $10^6$ m, $\lambda$, of $0.532 \times 10-6$ m and an aperture diameter of 3.67 m, the resolution is about 0.14 m.

Like many high quality telescopes the AEOS telescope provides nearly diffraction limited resolution. What is needed is techniques and equipment for improving the resolution of telescopes like AEOS and other telescopes to better than diffraction limited resolution.

SUMMARY OF THE INVENTION

The present invention provides a super-resolution Fourier telescope. A target is illuminated with at least three laser beams, each beam having a slightly different frequency so as to produce an illumination pattern comprised of several sets of straight interference fringes which sweep across the target. The frequencies of the illumination beams are chosen so that each pair of beams provides a unique beat frequency, and the corresponding fringe pattern for each pair sweeps over the target at a unique speed. By collecting a series of images, and demodulating them at the various beat frequencies, the downshifted spatial frequencies can be identified, correctly upshifted, and fitted together with a set of special Fourier transform type algorithms to reconstruct high-resolution images. Applicants have performed laboratory experiments and simulations that show that this invention can provide resolution substantially better than diffraction limited resolution.

Preferred embodiment include receiver detector components defining an array of high speed detectors adapted to monitor and record spatial intensity data at frequencies at least twice the highest beat frequency of the laser light reflected from the target; and at least one computer processor programmed with a set of algorithms for producing, from the recorded spatial intensity data, images of the target which are better than diffraction limited images corresponding to the telescope aperture. In a specific preferred embodiment the array of high speed detectors is an array of 32 ×32 avalanche photodiode detectors and the set of algorithm is adapted to determine phases of the uplink beam by comparing data in a spatial frequency overlap region and to combine redundant elements of the target's special frequencies in a noise optimized way. In this preferred embodiment the target illuminating laser system comprises a laser adapted to provide a series of very short pulses within bursts having durations of less than one millisecond. In a preferred configuration, the bursts are in the range of about 250 microseconds and the very short pulses are in the several microsecond range.

One application of this technique is the imaging of low-earth-orbit (LEO) satellites using land-based telescopes. The advantage of this method is that the resolution of existing telescopes (such as the AEOS telescope) or other optical imaging instrument can be increased without increasing the size and weight of the optical components. This resolution advantage has wide applicability in many military and commercial areas such as optical surveillance, satellite reconnaissance, and target identification in that high resolution imaging is obtained with less complicated and costly optical systems.

BRIEF DESCRIPTION OF THE DRAWINGS

FIG. 9B shows the equivalent equations when two beams are interfered to form fringes on a target. This is the fundamental description of how super resolution is possible. The three equation on the lower right show that if the fringes are imaged, that in addition to spatial frequencies of k which would be collected with a standard telescope, it is possible to collect spatial frequencies of k+ks and k−ks, where ks is determined by the spacing of the broadcast beams.

FIG. 9E shows this all on one chart.

FIG. 9F helps explain phase recovery.

FIG. 9G helps explain 3D imaging.

DETAILED DESCRIPTION OF PREFERRED EMBODIMENTS

First Preferred Embodiment

Figure 1:
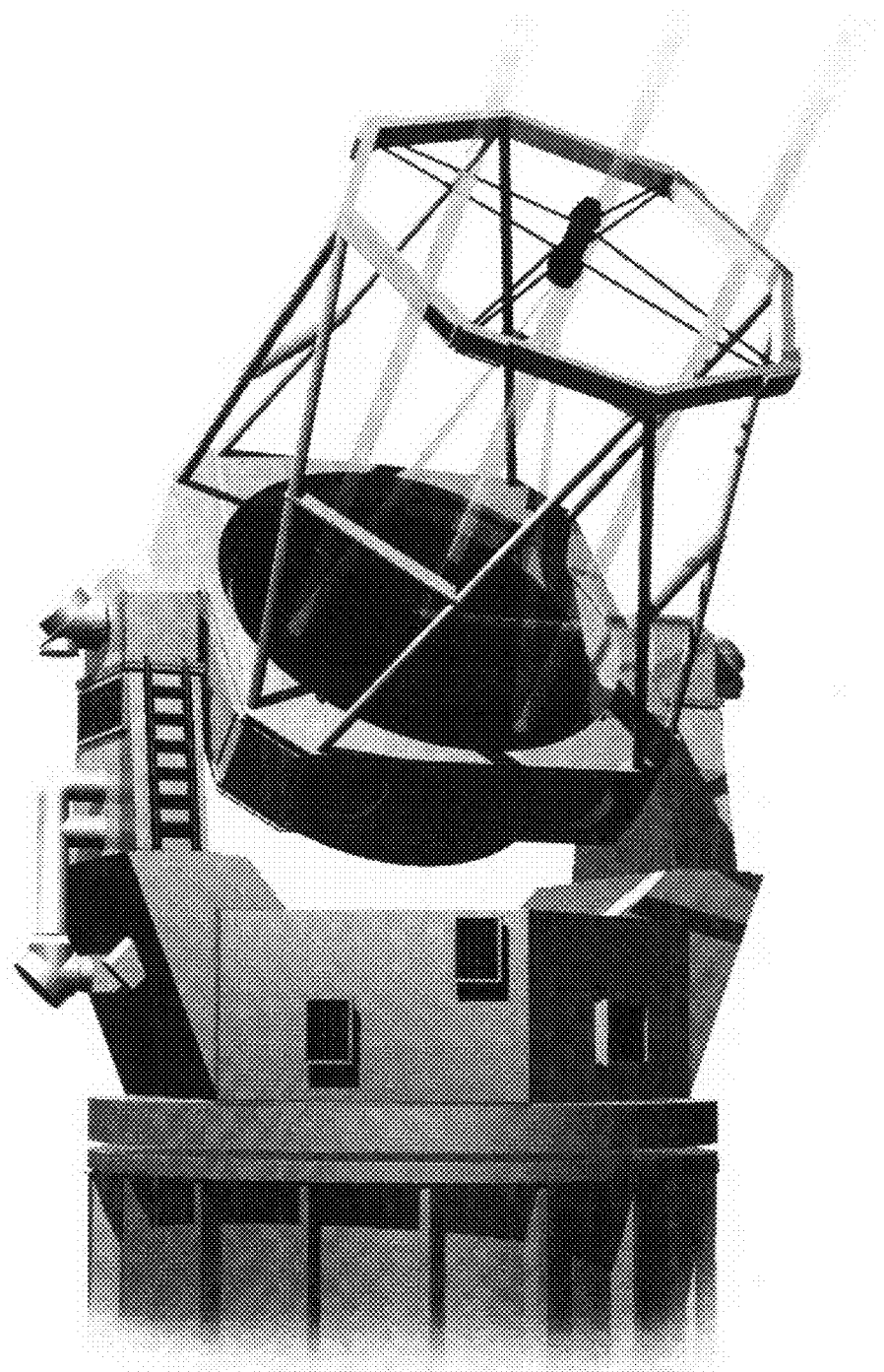
FIG. 1 is a drawing of a large existing 3.6 meter telescope modified for super-resolution in accordance with the present invention.
Figure 3:
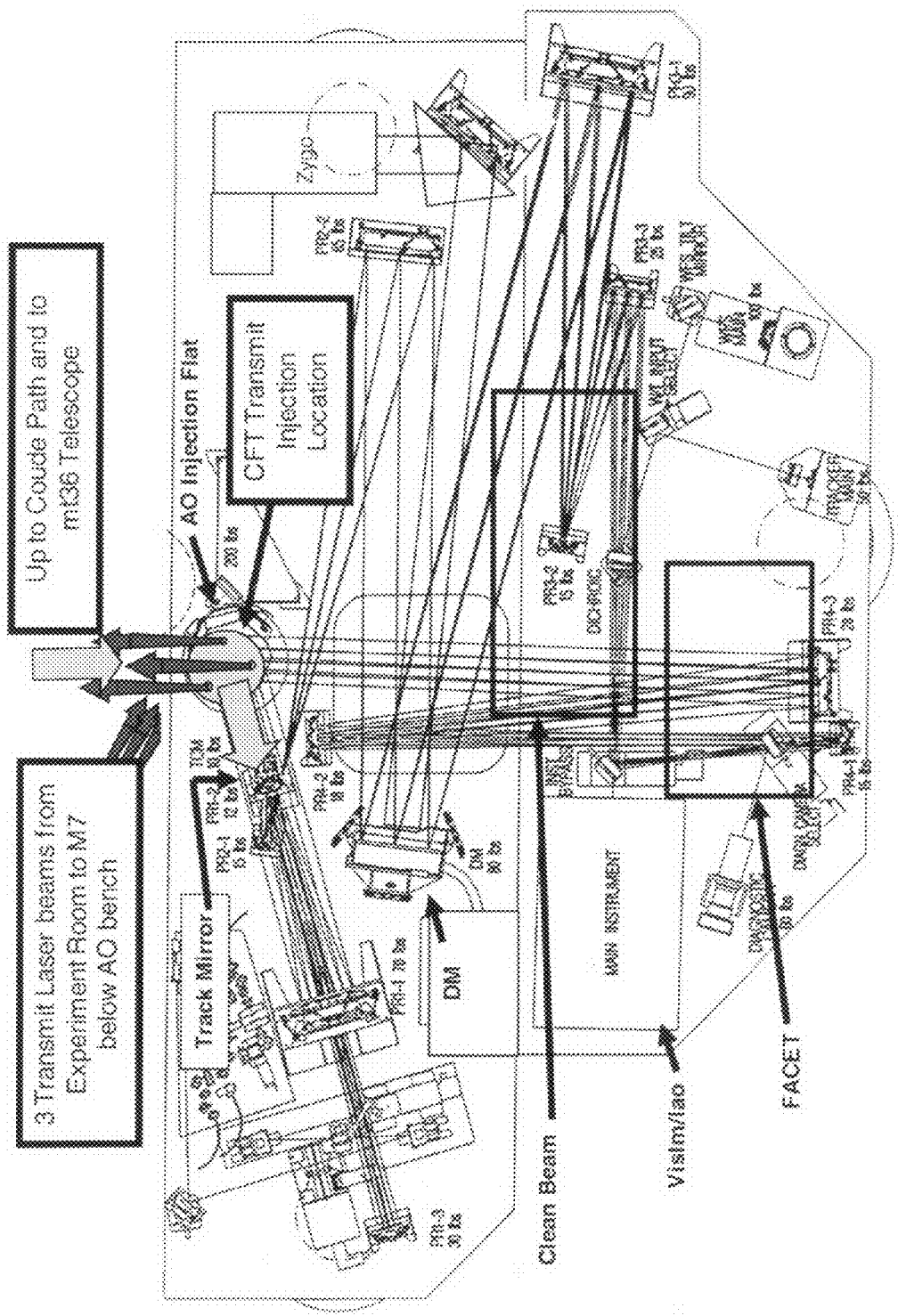
FIG. 3 is a layout of the existing AEOS adaptive optics bench showing the location of where the super resolution system could be implemented.

A first preferred embodiment of the present is a proposed modification of the AEOS 3.67 meter telescope located at summit of the dormant Haleakala volcano on Maui in Hawaii. (The AEOS telescope and its optics is sometime referred to as the mt36 referring to the 3.67 meter telescope. This first preferred embodiment is sometime referred to as the CFT for Compensated Fourier Telescope.) FIG. 1 is a drawing of the AEOS telescope with some added features of this first preferred embodiment. Applicants estimate that the resolution of the telescope will be improved by at least a factor of two. The telescope is modified to provide three 0.20 meter diameter laser beams equally spaced at the perimeter of the telescope aperture. The beams are at a nominal wavelength of 532 nm produced by a single continuous wave laser at a power level of about 100 watt. Detailed requirements for the laser in this preferred embodiment are set forth in Table I. The beam is separated into three legs of equal power. Each leg passes through an acoustic-optic modulator (AOM) which puts a unique frequency shift onto each beam. The three beams have the following frequency shifts of 0, 10, and 30 Hz. The beams are inserted into the AEOS beam train at a new special insertion mirror located at the position of the existing AEOS insertion mirror as shown in FIG. 3. The new insertion mirror will be on Kinematic mounts. It will be highly reflecting at the same specification as the existing mirror and will have three holes at the perimeter for transmission of the three laser beams exiting the AEOS coude room. The diameter of the insertion mirror is identical to the existing insertion mirror. The power density on any optic shall be less than 1 kW/cm$^2$. Each of the three individual laser legs requires a requires a tracker and point-ahead control for illuminating and imaging targets such as satellites. The existing tracker on the AEOS telescope can be used to control a point ahead mirror located in the ARES coude room.

The receive aperture for laser light reflected from a target is the receive aperture of the existing AEOS telescope as shown in FIG. 3. The received laser light from the target flows through the AEOS Adaptive Optics (AO) system for atmospheric compensation before reaching a detector system which is located on the AO table.

TABLE 1

Laser Requirements.

| Parameter | Required |
|---|---|
| Laser Type | Nd:YAG |
| Laser Power (W) | 100 |
| Laser Wavelength | 532 nm |
| Laser Coherence Length | 1 cm (30 GHz) |
| Uplink Pointing Jitter | 2 mrad |
| Laser Pulse Format (non-ranging) | 5-6 msec on with 50% duty cycle |
| Laser Pulse Format (ranging) | Same as non-ranging, but with 0.5 nsec pulses every 100 msec or less within the 5-6 msec macropulse |
| Laser BQ | 1.2 × DL |
| Laser Jitter | 500 nrad |
| Spatial Uniformity | 20% rms |
| Laser Frequency Modulation | >3 waves/2.8 msec, up to 3 waves/2.8 msec |

Receiver Detector

The Receiver detector should be located downstream of the adaptive optic (AO) deformable mirror so that receive laser light reflected from the target may benefit from atmospheric compensation. The receiver detector for this preferred embodiment should be located after the deformable mirror and should meet the requirements listed in Table 2.

TABLE 2

Receiver Detector Requirements

| Parameter | Required |
|---|---|
| Detector Type | Avalanche photodiode array |
| Detector Spatial Sampling | 100 nrad (10 cm @ 1 million meters) |
| Detector Spatial Array Size | 32 × 32 |
| Detector Temporal Sampling Accuracy (ranging) | <0.5 nsec |
| Detector Temporal Sampling Accuracy (non-ranging) | <100 msec |
| Detector QE | 0.4 |
| Detector Read-Noise | 0 |
| Detector Dark Current | 100 primary photoelectrons/sec |
| Detector Dead Time | <30 nsec |
| Detector Saturation | Not applicable |

Transmit Laser Description

Figure 2:
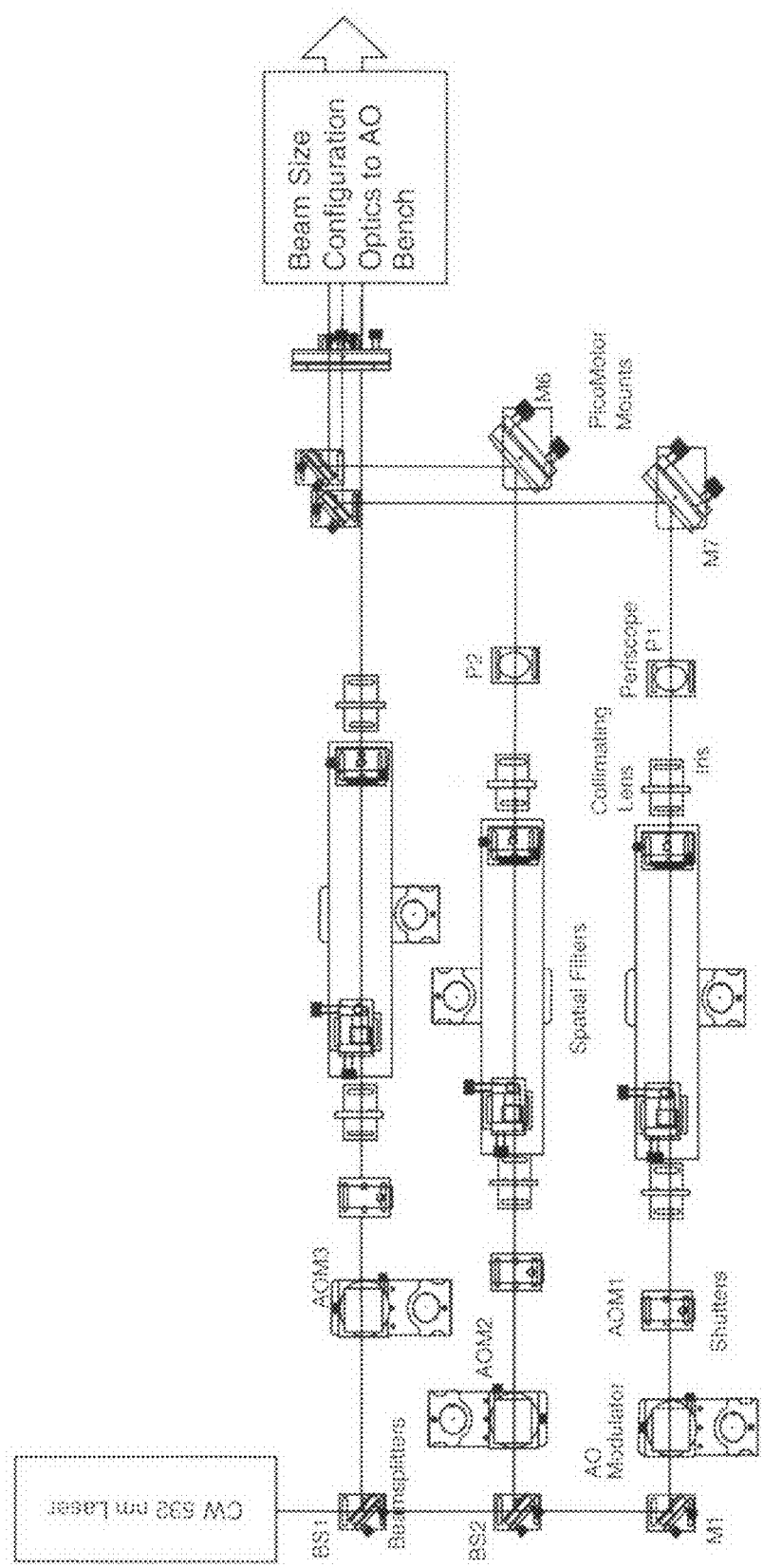
FIG. 2 is a layout showing the additional components necessary for super resolution.

A laser of 100 watts total power provides adequate signal strength on target for detectable reception through the AEOS telescope according to simulations performed by Applicants. The chosen wavelength is 532 nm. The laser meets the requirements. The laser beam is separated into three legs of equal power (30 W each). Each leg passes through an acoustic-optic modulator (AOM) which puts a unique frequency shift onto each beam. As indicated above the three beams respectively have the following frequency shifts: 0, 10, and 30 Hz. An example layout (demonstrated in a laboratory experiment as described below) for the laser, beam splitting, and implementation of the AEOS is shown in FIG. 2.

Preparation of Laser Beams

The preparation of the three laser beams should be accomplished on an optical bench which is elevated on pneumatic isolation legs. The beam diameter of each of the three transmit beams upon exit from the laser transmitter system will be determined based on the injection location into the AEOS beam path. The beam size should scale such that the magnification through the AEOS system yields a 20 cm diameter upon exit from the telescope. The three beams will be equally spaced in an equilateral triangular configuration. Similar to the beam sizes, the beam separation (center-to-center of sub-apertures) will also scale such that the magnification through the AEOS system yields a 305 cm separation upon exit from the telescope.

Transmit Laser Injection into AEOS Beam Train

The transmit laser shall be injected into the beam path at the location of the current AO Injection Mirror. The insertion method will involve moving the AO Injection Mirror to the available "OUT" position and installing a new mirror with three pass-through holes sized and aligned to the three CFT transmit laser paths. This mirror will be called the "CFT Injection Mirror" and will be in a mount with kinematic feet that are compatible with the existing AO Injection Mirror mount kinematic foot pads. The "OUT" position for the AO Injection Mirror is normally used in operations if light from the mt36 is desired to by-pass the AO system completely. The action of moving the AO Injection Mirror to the IN and OUT positions is a normal and routine activity. Thus, the insertion of the CFT transmit laser should have minimal impact on the AO system.

Transmit Laser Beam Size and Separation

Figure 3A:
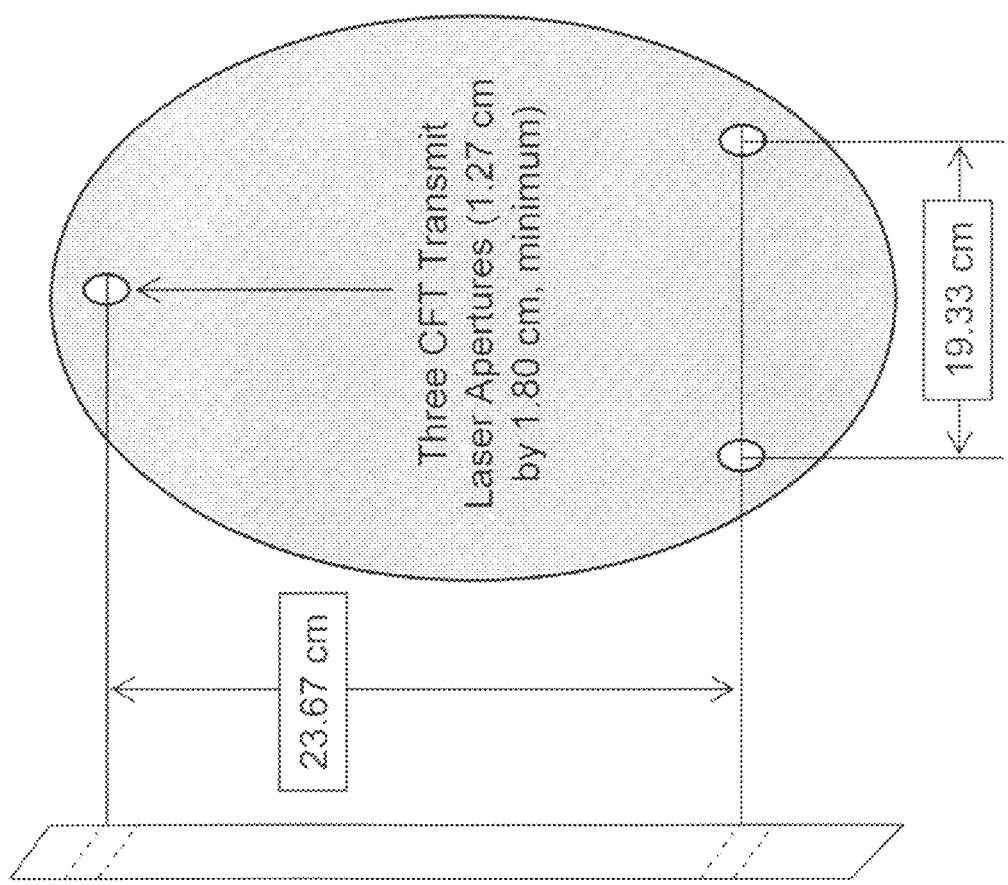
FIG. 3a shows a concept for the new insertion mirror that would be used to replace the existing AEOS insertion mirror for super resolution.

The beam size at the injection mirror is about 23 cm based on the scaling referred to above. The injection mirror shall be oriented at approximately a 45 degree angle to the beams. Thus, the mirror shall have a physical size to accommodate an elliptic beam footprint of at least 23 cm by 32.6 cm as shown in FIG. 3A. For a transmit laser output diameter of 20 cm, the three transmit laser beam diameters shall be 1.27 cm each upon exit from the transmitter location in an experiment room. For a transmit laser output beam separation of 305 cm, the three transmit laser beams shall be separated by 19.33 cm in an equilateral triangle configuration. A summary of telescope optics, AO optics, beam sizes, beam separations, and power density is shown in Table 3 and for the case in which each of the three beams has 30 W transmit laser power.

The injection mirror pass-through holes for the transmit laser shall be spaced to accommodate the projection of the three 19.33 cm spaced beams (length of legs of the equilateral triangle) onto the optic at an angle of 45 degrees. For the condition in which two transmit beams are near the bottom and the third is near the top of the injection mirror, the hole spacing in the mirror (in the plane of the surface of the mirror) shall be 19.33 cm between the bottom two holes and 23.67 cm between the top hole and each of the bottom holes, as shown in FIG. 3A.

TABLE 3

Transmit Laser Injection Beam Size, Separation, and Power Density

| Each laser beam diameter | Beam Separation | laser beam power for each transmit beam |
|---|---|---|
| 20 cm | 305.00 cm | 30 W/cm$^2$ |

| Optic Name | substrate material | Coating Type | Pupil Image Diameter (cm) | Laser Beam Diameter, each subaperture (cm) | Beam Separation (cm) | Power Density on Optic (W/cm$^2$) |
|---|---|---|---|---|---|---|
| mt36 Primary (M1) | | Bare Al | 363.0 | 20.00 | 305.00 | 0.10 |
| mt36 Secondary (M2) | | SF-99 | 25.4 | 1.40 | 21.34 | 19.50 |
| mt36 Tertiary (M3) | | SF-99 | 23.0 | 1.27 | 19.33 | 23.79 |
| mt36 Coude 1 (M4) | | SF-99 | 23.0 | 1.27 | 19.33 | 23.79 |
| mt36 Coude 2 (M5) | | SF-99 | 23.0 | 1.27 | 19.33 | 23.79 |

TABLE 3-continued

Transmit Laser Injection Beam Size, Separation, and Power Density

| Element | Substrate | Coating | | | | |
|---|---|---|---|---|---|---|
| mt36 Coude 3 (M6) | | SF-99 | 23.0 | 1.27 | 19.33 | 23.79 |
| Coude Window Filter Wheel | | BK7, MgF2 | 23.0 | 1.27 | 19.33 | 23.79 |
| CFT Injection Mirror | Zerodur | e.g. Aluminum, first-surface silver | 23.0 | 1.27 | 19.33 | n/a (pass-through holes) |
| Input Fold Flat | zerodur-special grade | FSS-99 Enhanced Silver | 23.0 | n/a | n/a | n/a |
| PR1-1 | zerodur-special grade | FSS-99 Enhanced Silver | 23.0 | n/a | n/a | n/a |
| PR1-2 | zerodur-special grade | FSS-99 Enhanced Silver | | n/a | n/a | n/a |
| PR1-3 | zerodur-special grade | FSS-99 Enhanced Silver | 4.0 | n/a | n/a | n/a |
| TM (tracker mirror) | HIP-I70A optical grade Beryllium | FSS-99 Enhanced Silver | 4.0 | n/a | n/a | n/a |
| PR2-1 | zerodur-special grade | FSS-99 Enhanced Silver | 4.0 | n/a | n/a | n/a |
| PR2-2 | zerodur-special grade | FSS-99 Enhanced Silver | 28.8 | n/a | n/a | n/a |
| DM (deformable mirror) | | FSS-99 Enhanced Silver | 28.8 | n/a | n/a | n/a |
| PR3-1 | zerodur-special grade | FSS-99 Enhanced Silver | 28.8 | n/a | n/a | n/a |
| PR3-2 | zerodur-special grade | FSS-99 Enhanced Silver | | n/a | n/a | n/a |
| PR3-3 | zerodur-special grade | FSS-99 Enhanced Silver | 2.2 | n/a | n/a | n/a |

Transmit Laser Track and Point-Ahead

The injected laser light will not encounter either the AEOS deformable mirror or the AEOS tracker. Thus, the outgoing laser light cannot be compensated nor utilize the AO Fast Steering Mirror (FSM, aka Tracker Control Mirror (TCM)) to achieve track/point-ahead. A separate fast steering mirror shall be located on the transmitter table and shall be slaved to the AO tracker system to achieve point-ahead angles. The track system will utilize the AO Track Camera as it closes track loop on the return light from the target.

Details of Algorithm

A preferred algorithm for converting collected data reflected from the target is described in this section. As described above the information is obtained from pairs of beating beams which apply a sinusoidal intensity modulation to a target (sometime referred to herein as (an "object"). The sinusoidal modulation offsets the spatial frequencies measured by the camera by in effect "mixing" the image with the modulation, thereby "down-converting" the high spatial frequencies of the object down to spatial frequencies resolvable with the telescope.

There are two components to the algorithm:
1. Determination of the phases of the uplink beams by comparing data in the spatial frequency overlap region, in a noise-optimized way
2. Combining the redundant elements of the object's spatial frequencies in a noise-optimized way We will consider here that the illuminating lasers are of sufficient bandwidth so that speckle effects are insignificant.

Consider then an object intensity profile given by $I_{ob}(x,y)$, with a depth function $z(x,y)$. When we illuminate with short pulse lasers, and use a time resolved detector, we are in effect dividing the image into depth slices. We therefore more conveniently describe the intensity function as a series of slices $I_{ob}(x,y,z)$, where each value of z used represents a time bin.

This intensity pattern is illuminated by the multiple illumination lasers. For this case we will assume 3 lasers situated at the periphery of the aperture. We will assume that the aberrations for these 3 beams will be insignificant (for now), but the relative phases between the beams is unknown. We will call the single beam uplink pattern $I_{up}(x,y)$, and the laser positions $x_1,y_1 \ldots x_3,y_3$. Then the projected pattern at the object is $$I_{ill}(x, y) = I_{up}(x, y) \cdot \left| \begin{array}{l} \exp(2\pi i(x \cdot x_1 + y \cdot y_1)/\lambda R + i\omega_1 t + i\varphi_1) + \\ \exp(2\pi i(x \cdot x_2 + y \cdot y_2)/\lambda R + i\omega_2 t + i\varphi_2) + \\ \exp(2\pi i(x \cdot x_3 + y \cdot y_3)/\lambda R + i\omega_3 t + i\varphi_3) \end{array} \right|^2$$

The reflected intensity $I_{ref} = I_{ill}(x,y) \cdot I_{ob}(x,y,z)$. Notice that while $I_{ob}$ is a function of z, $I_{ill}$ is not. This is very important for noise properties, because the phasing information from all of the slices is the same so can be combined.

The breakthrough of the present approach was the realization that use of slices greatly facilitated the phasing; this is because phasing requires high spatial frequency features to "key off" of, and the slices have a lot more high spatial frequency content than the flat image. In this case we will likewise combine the data from the slices to get robust estimates of the unknown phase.

For now, we will assume a diffraction-limited receiver aperture. The telescope point spread function PSF(x,y) is then the standard form for a circular aperture. The measurement is then $$M(x,y,z) = [I_{ill}(x,y) \cdot I_{ob}(x,y,z)] \bigcirc PSF(x,y),$$

where the operator "$\bigcirc$" denotes convolution. Here we have assumed that the detector has sampled the data out to the Nyquist limit, at least two pixels per $\lambda/D$. When we extract the DC component and 3 beat frequencies from the measurement, we obtain the components $$M_{DC}(x,y,z) = [3 \cdot I_{up}(x,y) \cdot I_{ob}(x,y,z)] \bigcirc PSF(x,y)$$

$$M_{12}(x,y,z) = [I_{up}(x,y) \cdot I_{ob}(x,y,z) \cdot \exp(i(k_{x1}-k_{x2}) \cdot x + i(k_{y1}-k_{y2}) \cdot y + i(\phi_1-\phi_2))] \bigcirc PSF(x,y)$$

$$M_{23}(x,y,z) = [I_{up}(x,y) \cdot I_{ob}(x,y,z) \cdot \exp(i(k_{x2}-k_{x3}) \cdot x + i(k_{y2}-k_{y3}) \cdot y + i(\phi_2-\phi_3))] \bigcirc PSF(x,y)$$

$$M_{31}(x,y,z) = [I_{up}(x,y) \cdot I_{ob}(x,y,z) \cdot \exp(i(k_{x3}-k_{x1}) \cdot x + i(k_{y3}-k_{y1}) \cdot y + i(\phi_3-\phi_1))] \bigcirc PSF(x,y)$$

where $k_{xi} = 2\pi x_i/\lambda R$, $k_{yi} = 2\pi y_i/\lambda R$.

The Poisson noise in the DC component is a real Gaussian random variable with variance (when normalized to photocounts)

$$\sigma^2_{DC} M_{DC}(x,y,z).$$

The AC components have complex Gaussian random noise with complex variance $$\sigma^2_{12} = \sigma^2_{23} = \sigma^2_{31} = M_{DC}(x,y,z).$$

Detector noise would be added to this variance, and should be the same increase for each of these quantities.

Next we will define new terms to simplify the discussion. For the DC term, we will just redefine its PSF-like term:

$$T_{DC}(x,y) := 3 \cdot PSF(x,y)$$

$$M'_{DC}(x,y,z) = M_{DC}(x,y,z) = [I_{up}(x,y) \cdot I_{ob}(x,y,z)] \bigcirc T_{DC}(x,y)$$

For the AC terms, we will introduce a phase slope onto the measurements, which does not affect the noise properties:

$$M'_{12}(x,y,z) = M_{12}(x,y,z) \cdot \exp(-i(k_{x1}-k_{x2}) \cdot x + -i(k_{y1}-k_{y2}) \cdot y)$$

so that $$M'_{12}(x,y,z) = \exp(i((\phi_1-\phi_2)) \cdot [I_{up}(x,y) \cdot I_{ob}(x,y,z)] \bigcirc T_{12}(x,y)$$

$$T_{12}(x,y) := PSF(x,y) \cdot \exp(i(k_{x1}-k_{x2}) \cdot x + i(k_{y1}-k_{y2}) y)$$

and similarly for the other AC components. These expressions are in an especially convenient form to consider in Fourier space.

As a further abstraction to simplify the terminology, just call $$I := I_{up}(x,y) \cdot I_{ob}(x,y,z)$$

$$M'_{12} := M'_{12}(x,y,z), \text{ etc.}$$

$$\exp(i\phi_{12}) := \exp(i((\phi_1-\phi_2)), \text{ etc.}$$

and $T_{12}$ will represent the linear operator "$\bigcirc T_{12}(x,y)$", etc. Then we have $$M'_{DC} = T_{DC}I + n_{DC}$$

$$M'_{12} = \exp(i\phi_{12}) T_{12} I + n_{12}$$

$$M'_{23} = \exp(i\phi_{23}) T_{23} I + n_{23}$$

$$M'_{31} = \exp(i\phi_{31}) T_{31} I + n_{31}$$

Since the noise terms all have the same variance, which we will call $\sigma^2(x,y,z)$ or just $\sigma^2$, the optimum values for the unknowns is found by minimizing w.r.t. I and $\phi$ the average over x,y,z of:

$$\{|M'_{DC} - T_{DC}I|^2 + |M'_{12} - \exp(i\phi_{12})T_{12}I|^2 + |M'_{23} - \exp(i\phi_{23})T_{23}I|^2 + |M'_{31} - \exp(i\phi_{31})T_{31}I|^2\}/\sigma^2$$

Variation w.r.t. I gives $$0 = T_{DC}^\dagger ((M'_{DC} - T_{DC}I)/\sigma^2) + T_{12}^\dagger ((\exp(-i\varphi_{12})M'_{12} - T_{12}I)/\sigma^2) + T_{23}^\dagger ((\exp(-i\varphi_{23})M'_{23} - T_{23}I)/\sigma^2) + T_{31}^\dagger ((\exp(-i\varphi_{31})M'_{31} - T_{31}I)/\sigma^2)$$

In order to (greatly) simplify the mathematics, we are going to let the T operators commute with the $1/\sigma^2$ operation. This is reasonably justified since $1/\sigma^2$ is considerably more slowly varying that T. This allows us to solve for I:

$$I = \{T_{DC}^\dagger T_{DC} + T_{12}^\dagger T_{12} + T_{23}^\dagger T_{23} + T_{31}^\dagger T_{31}\}^{-1} \ldots \{T_{DC}^\dagger M'_{DC} + \exp(-i\phi_{12}) T_{12}^\dagger M'_{12} + \exp(-i\phi_{23}) T_{23}^\dagger M'_{32} + \exp(-i\phi_{31}) T_{31}^\dagger M'_{31}\}$$

This is the expression we use to find the image once we have solved for the phase. Since the T operators are just convolutions, the entire evaluation becomes a few convolutions. The inverse operation only needs to be computed once for a given configuration.

To solve for the phases, we take this solution for I and plug back into the minimization function. Since we only are solving for phase, we first throw out terms which have no phase dependence:

maximize average of $$2 \cdot Re\{M^{*'}_{DC} T_{DC} I + M^{*'}_{12} \exp(i\phi_{12}) T_{12} I + M^{*'}_{23} \exp(i\phi_{23}) T_{23} I + M^{*'}_{31} \exp(i\phi_{31}) T_{31} I\}/\sigma^2$$

which can be written $$2 \cdot \{[M^{*'}_{DC} + M^{*'}_{12} \exp(i\phi_{12}) T_{12} + M^{*'}_{23} \exp(i\phi_{23}) T_{23} + M^{*'}_{31} \exp(i\phi_{31}) T_{31}] \cdot [T_{DC}^\dagger T_{DC} + T_{12}^\dagger T_{12} + T_{23}^\dagger T_{23} + T_{31}^\dagger T_{31}]^{-1} \ldots [T_{DC}^\dagger M'_{DC} + \exp(-i\phi_{12}) T_{as}^\dagger M'_{12} + \exp(-i\phi_{23}) T_{23}^\dagger M'_{23} + \exp(-i\phi_{31}) T_{31}^{554} M'_{31}]\}/\sigma^2$$

In order to carry out this computation, a straightforward implementation is to form a figure-of-merit image FOM(x,y,z,$\phi_{12}$,$\phi_{23}$,$\phi_{31}$)

$$FOM = (1/\sigma) \{T_{DC}^\dagger T_{DC} + T_{12}^\dagger T_{12} + T_{23}^\dagger T_{23} + T_{31}^\dagger T_{31}\}^{-1/2} \ldots \{T_{DC}^\dagger M'_{DC} + \exp(-i\phi_{12}) T_{12}^\dagger M'_{12} + \exp(-i\phi_{23}) T_{23}^\dagger M'_{23} + \exp(-i\phi_{31}) T_{31}^\dagger M'_{31}\}$$

and then find the maximum over the two unknown phase parameters of $FOM^2$ averaged over x,y,z. Since T is just a convolution, the half power merely requires performing a square root in the Fourier domain. This phase finder implementation is nice because it has a number of terms in common with the image computation expression. Since in this case we only have 2 parameters to optimize, we might as well just brute force the search. If more beams are used, then a SAINT-style search algorithm can be included. (A SAINT-style algorithm is provided in companion patent application filed concurrently with this application entitled "Fourier Telescopic Imaging System and Method" which is incorporated by reference herein.)

Once we have found the phases, then we can go back to the above expression for the optimum image and compute the image slices.

When we perform inverse operations above, it should be noted that regularization parameters are added to prevent excessive noise amplification. The values of the parameters are truly a matter of taste, as it is really just a means of getting data from the computer into the reviewer's eye. Typically 10% of the max value is a reasonable way to pick a value. Changing the value only changes the degree to which the image looks filtered, it does not really change any information content.

Figure 9A:
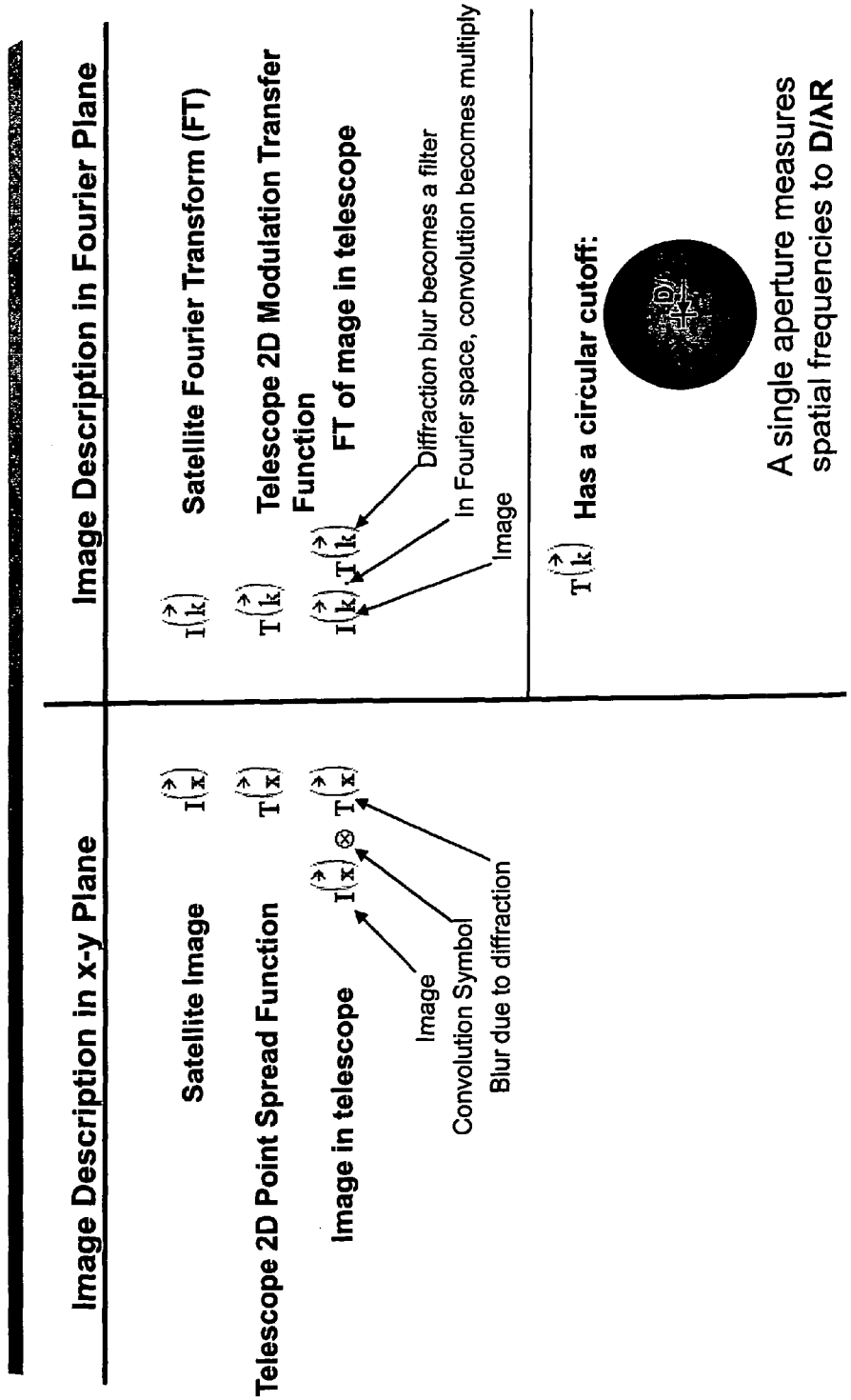
FIG. 9A provides a description of basic imaging through a fixed aperture.
Figure 9C:
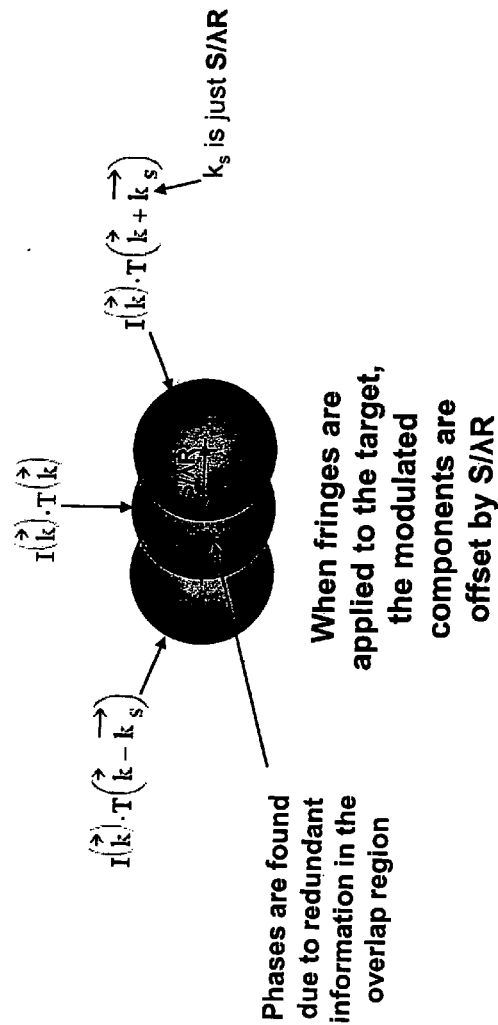
FIG. 9C shows this pictorially in one dimension.
Figure 9D:
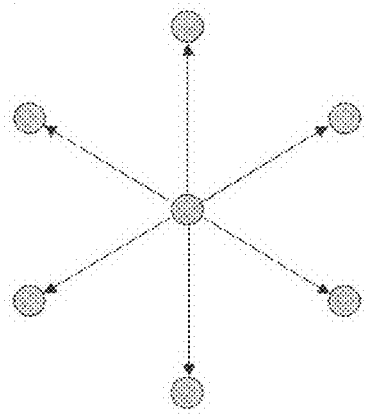
FIG. 9D shows how using multiple broadcast beams in two dimensions fills in the frequency plane with information in excess of the normal diffraction limit.
Figure 9D:
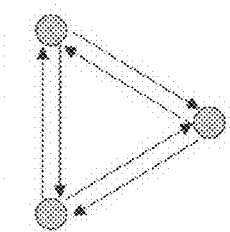

To help explain the operation of the operation of the reconstruction algorithm, Applicants have included FIGS. 9A through 9G. FIG. 9A compares the target image in the x-y plane. FIG. 9B provides a Fourier description of the images with stripes in both planes. FIG. 9C shows how the striped images are overlaid and combined to find phases. FIG. 9D explains how the three lasers produce three baselines. FIG. 9E helps explain the mathematics of the algorithms. FIG. 9F explains phase recovery. FIG. 9G shows the advantages of 3D imaging.

Laboratory Demonstration

The validity of Applicants' approach to super-resolution has been examined by means of numerical simulation and a laboratory experiment. This section describes the laboratory experiment.

The maximum angular resolution of an image formed by a conventional imaging system is determined by the fundamental diffraction limit $\sim\lambda/D$ where $\lambda$, is the wavelength used for imaging and D is the diameter of the aperture stop of the imaging system. Two examples of this aperture are the variable iris in a camera lens and the unobstructed part of the primary mirror of a reflective telescope. "Super-resolution" refers to various techniques for exceeding this fundamental resolution limit. The effect is similar to having a conventional optical system with a larger aperture, as we demonstrate below.

This super-resolution method consists of illuminating the object with a pattern comprised of several sets of straight interference fringes formed by pairs of laser beams. The effect of the patterned illumination is to down shift spatial frequencies (moire effect) that would otherwise be blocked by the aperture so that they pass through the optical system. The frequencies of the illumination beam are chosen so that each pair of beams has a unique frequency difference, and the corresponding fringe pattern sweeps over the target at a unique speed. By collecting a series of images, and demodulating them at the various beat frequencies, the downshifted spatial frequencies can be identified, correctly up-shifted, and fitted together to reconstruct the higher-resolution image.

Figure 4:
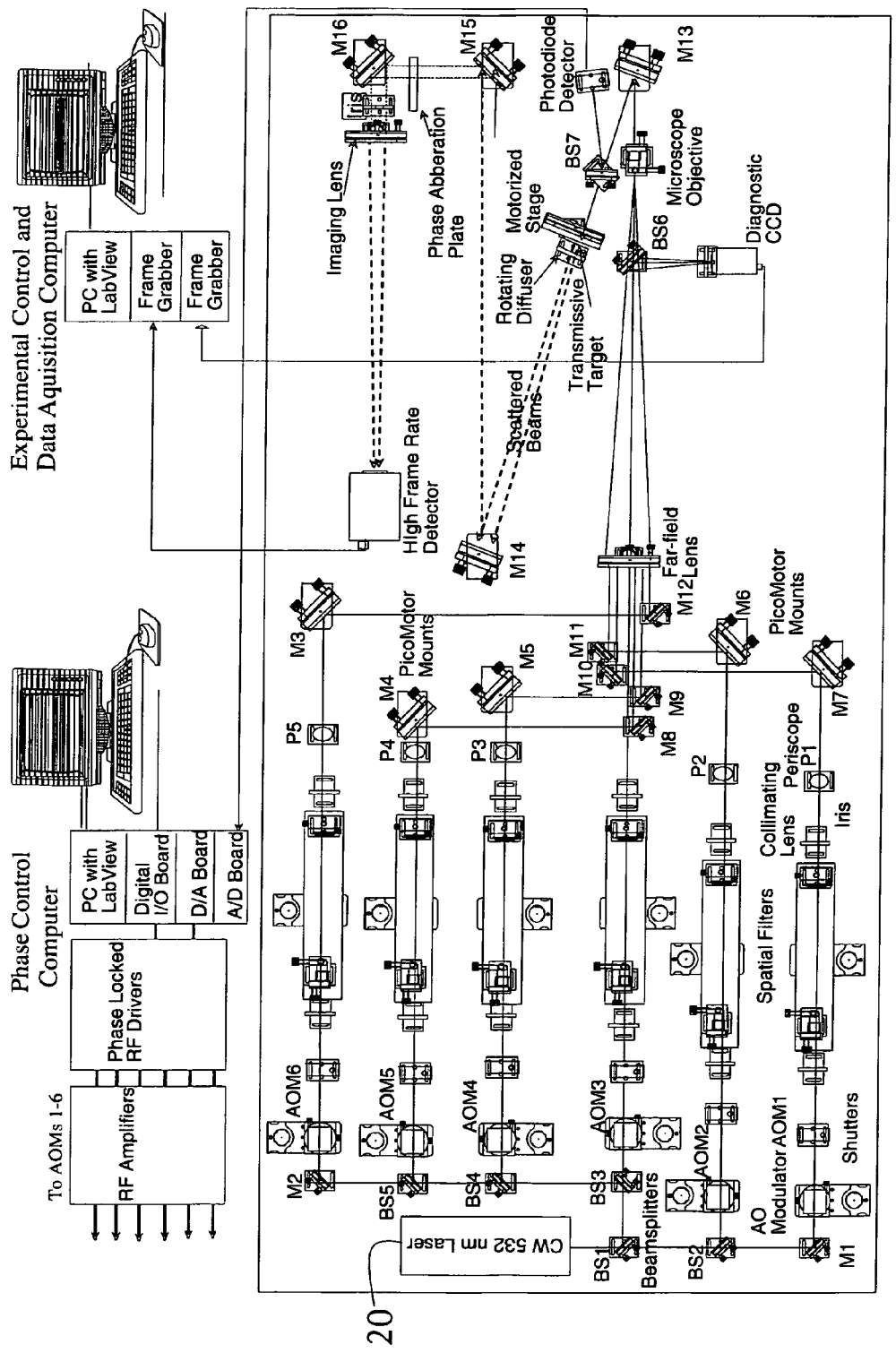
FIG. 4 is a schematic layout of the setup used to demonstrate super resolution in the laboratory.

A laboratory experiment demonstrating the capability of Applicants' supper-resolution technique has been completed. A schematic drawing of the experimental setup is shown in FIG. 4. The illumination source 20 is a diode-pumped, frequency-doubled Nd:YAG laser with a 200-milliwatt continuous-wave output. The laser beam is split into six approximately equal-power beams AOM1 through AMO6. Depending on the application, as few as three illumination beams can be used, but additional enhancement can be obtained by adding more beams. In the following, we describe results involving both three- and six-beam illumination.

The frequency of each beam is shifted by reflection from a traveling sound wave in an acousto-optic modulator (AOM). Amplified sine waves from Programmed. Test Systems (PTS) Model x10 frequency synthesizers produce the signals that drive the AOMs' sound waves. As an example of choosing the beam frequencies properly, in one instance the AOMs were driven by the frequency synthesizers at 40 MHz, 40 MHz+50 Hz, and 40 MHz+150 Hz, so that the beat frequencies measured at a point in the interference pattern contained 50, 100, and 150 Hz frequency components.

The desired fringe illumination pattern is generated in the far-field by focusing the beams toward the target from near the periphery of a large lens. A second collimating lens then forms a scaled copy of the fringe pattern that would result if the beams had been projected by a telescope toward a LEO satellite. Photographic transparencies for testing the imaging concept are illuminated by the fringe pattern. The dimensions of the target images (which were about 3 mm), the spacing of the interference fringes (which were about 4/mm), and the diameter of the illumination beams are correctly scaled with respect to the optical system to be approximately physically equivalent to the planned field imaging system (the AEOS modified system described above).

A rapidly rotating diffusing plate sits directly behind the target transparencies to mimic the diffuse-reflection characteristics of real specular targets and also the shorter coherence length of the illumination lasers that would be used in a fielded system. A pair of lenses images the target on a high-speed charge-coupled-device (CCD) camera with 128×128 pixels from DALSA operating at 830 Hz frame rate as the time-resolved focal plane detector in this laboratory setup. An iris was placed directly in front of the target imaging lens to function as a variable aperture stop for the system. By adjusting the size of this iris, we could obtain various resolution levels of the target on the DALSA camera.

The CCD collects a sequence of images, which are saved in a file for further processing.

The laboratory experiment is controlled by a single main computer that contains a frame grabber so that the high speed CCD camera data can be recorded and stored. These sequential images of the recorded modulated fringe pattern on the target are then processed and reconstructed using a developed algorithm to obtain the super-resolution information of the target. This experiment computer also uses a secondary camera as a diagnostic to verify the beams are overlapped on the target image. An auxiliary phase control computer was also utilized to control the beam shutters and frequency modulators within the experimental setup.

Figure 5A:
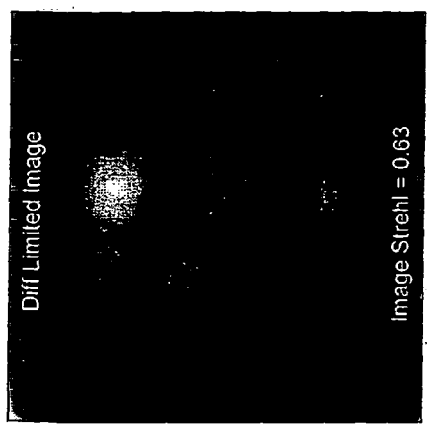
FIGS. 5 and 6 shows experimental results taken with the setup in FIG. 4
Figure 5B:
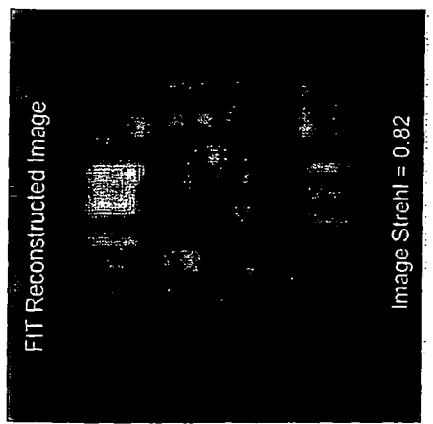
Figure 5C:
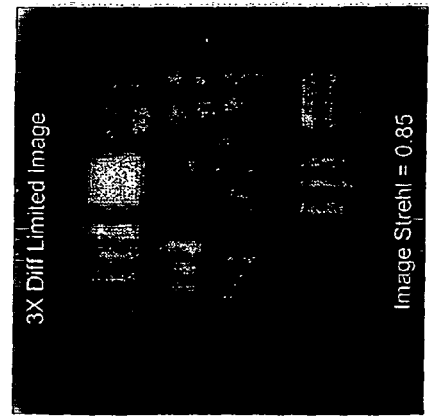

FIGS. 5A through 6C show typical experimental images demonstrating the feasibility of the super-resolution concept, referred to in the images as FIT images (for "Fringe Imaging Telescopy"). FIG. 5A is a diffraction-limited image of a 1951 Air Force resolution chart. FIG. 5B shows the same image, but with increased resolution due to FIT super-resolution that was obtained using six illumination beams. For comparison, FIG. 5C shows an unenhanced image, but with an optical aperture three times the diameter of the aperture used to obtain the image in FIG. 5A.

Figure 6A:
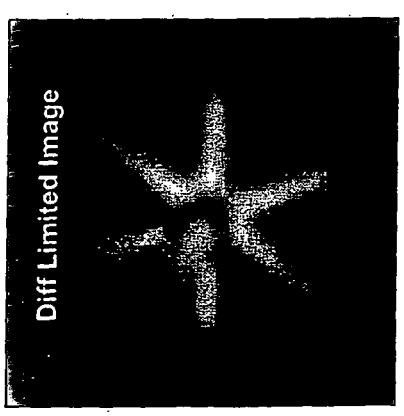
Figure 6B:
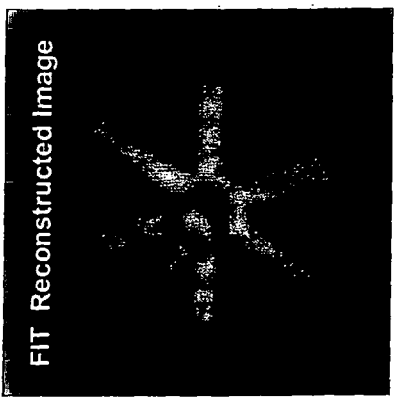
Figure 6C:
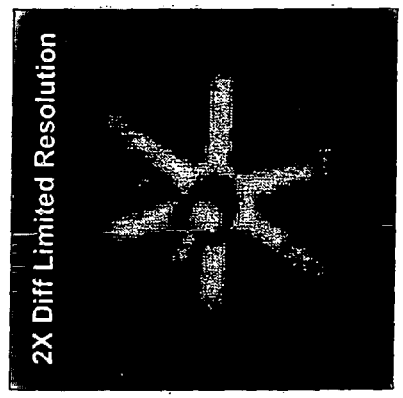

Similarly FIG. 6A is the diffraction-limited image of a reproduce satellite target. A three-beam FIT system increases the image's resolution, as seen in FIG. 6B, comparable to an image made with an optical system with twice the original aperture diameter. The results demonstrate that the increase in resolution by the FIT technique is the equivalent of what would be attained with a larger optical system. Detailed analysis of both the image modulation transform function (MTF) and image Strehl has verified that the reconstructed images approach the resolution of either the twice diffraction limited image for the three beam case or three times the diffraction limited resolution for the six beam results.

Simulations of Proposed Ground Demonstration

Applicants have planned a ground demonstration of the super-resolution technique utilizing the 2.4 meter Magdalena Ridge Observatory (MRO) telescope. The anticipated layout of the super-resolution ground demonstration would be to place a small target at a range of 0.5-1 km away from the MRO telescope. At these ranges, the integrated atmospheric turbulence is expected to be sufficiently small such that near diffraction limited imaging can be obtained utilizing only tip/tilt correction to provide for image stabilization on the receiver detector. Also, the target ranges are sufficiently distant enough to allow use of reasonable size targets of a few millimeters in diameter. The three laser illumination output beams could either be placed at the perimeter of the 2.4 meter telescope on the primary mount truss or injected through the telescope optics and mapped to the perimeter telescope aperture.

Figure 7:
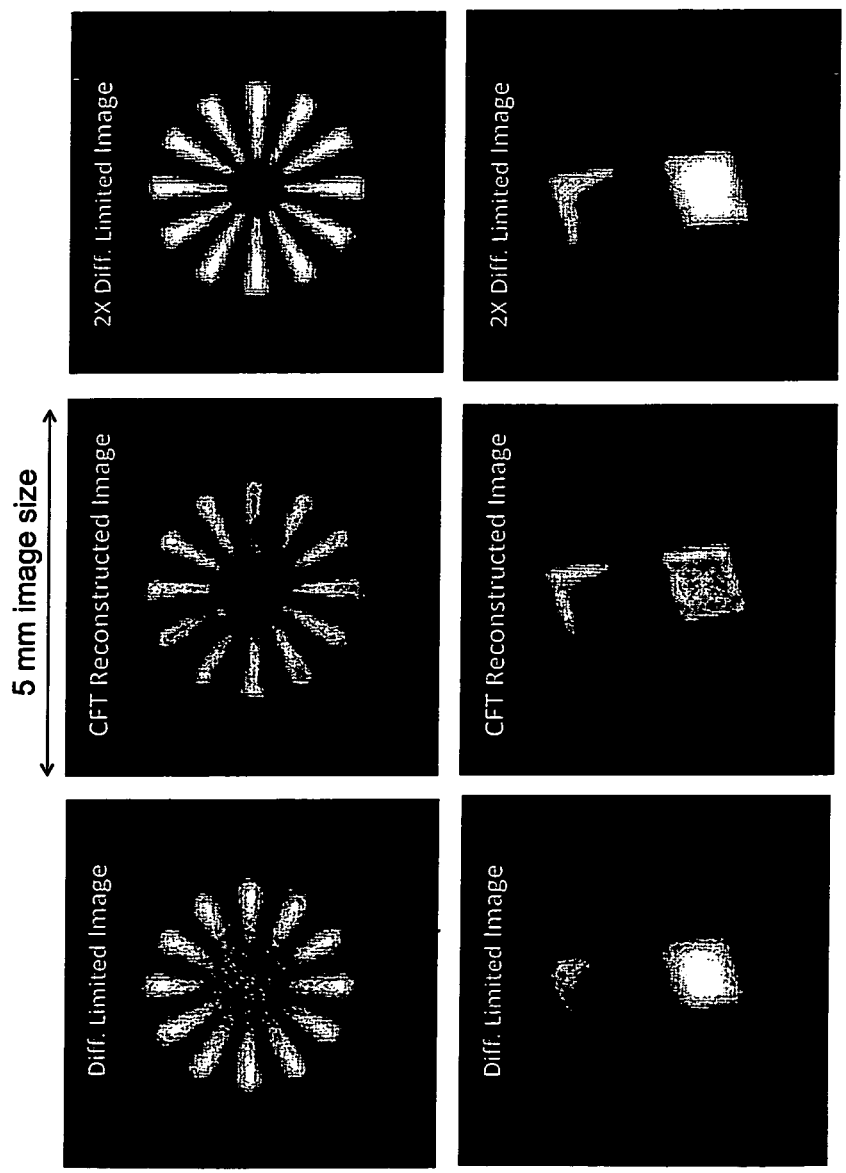
FIG. 7 shows additional data taken with the setup in FIG. 4.

FIG. 7 provides examples of simulated images representing images that could be obtained in this ground demonstration. In this example, both a radial spoke target and a satellite target profile was used to illustrate the super-resolution improvement capability that could be demonstrated by this experiment. These simulated results again clearly show that the resultant super-resolution images contain nearly the identical spatial resolution as simulated images computed assuming a 4.8 meter aperture, which is twice the diffraction limit of the MRO telescope.

Preferred Laser System

As suggested above many high power lasers are available meeting the laser requirements set forth in Table I. Applicants have however have developed a specially designed a laser system for the AEOS and MRO telescope applications. This design is described below with reference to FIG. 8A through FIG. 8H.

Figure 8B:
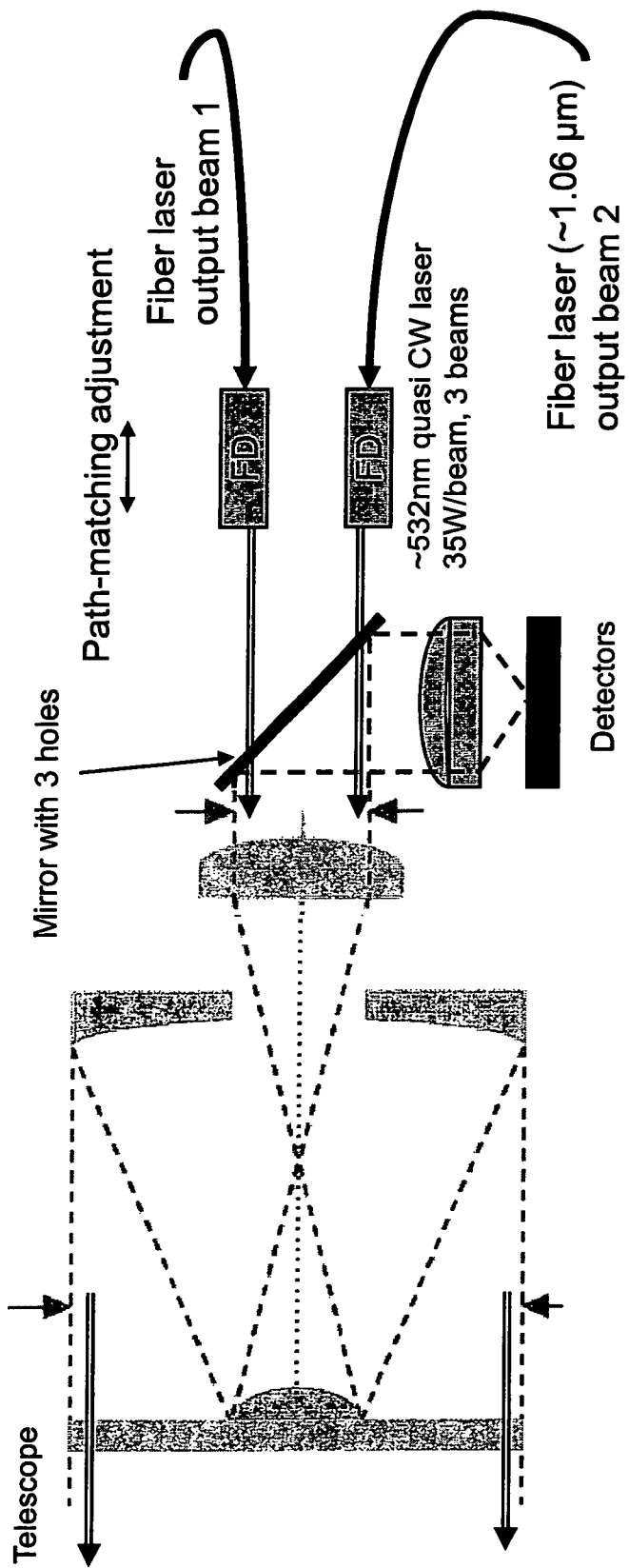
FIG. 8B shows a laser transmitter concept that would be employed on the AEOS telescope.
Figure 8C:
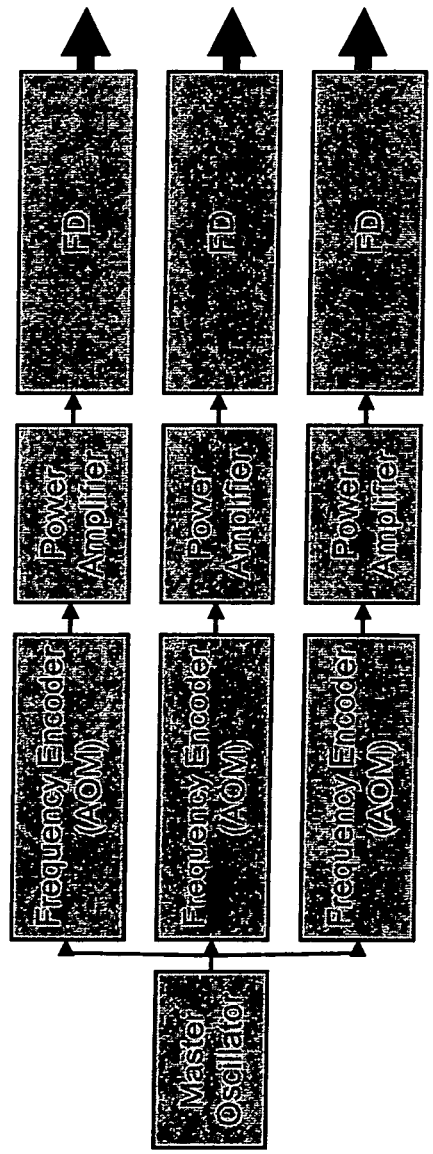
FIG. 8C shows a master oscillator/power amplified arrangement for the super resolution method FIG. 8D lists the master oscillator specifications FIG. 8E lists the path matching requirements for implementing super resolution on the AEOS telescope.
Figure 8E:
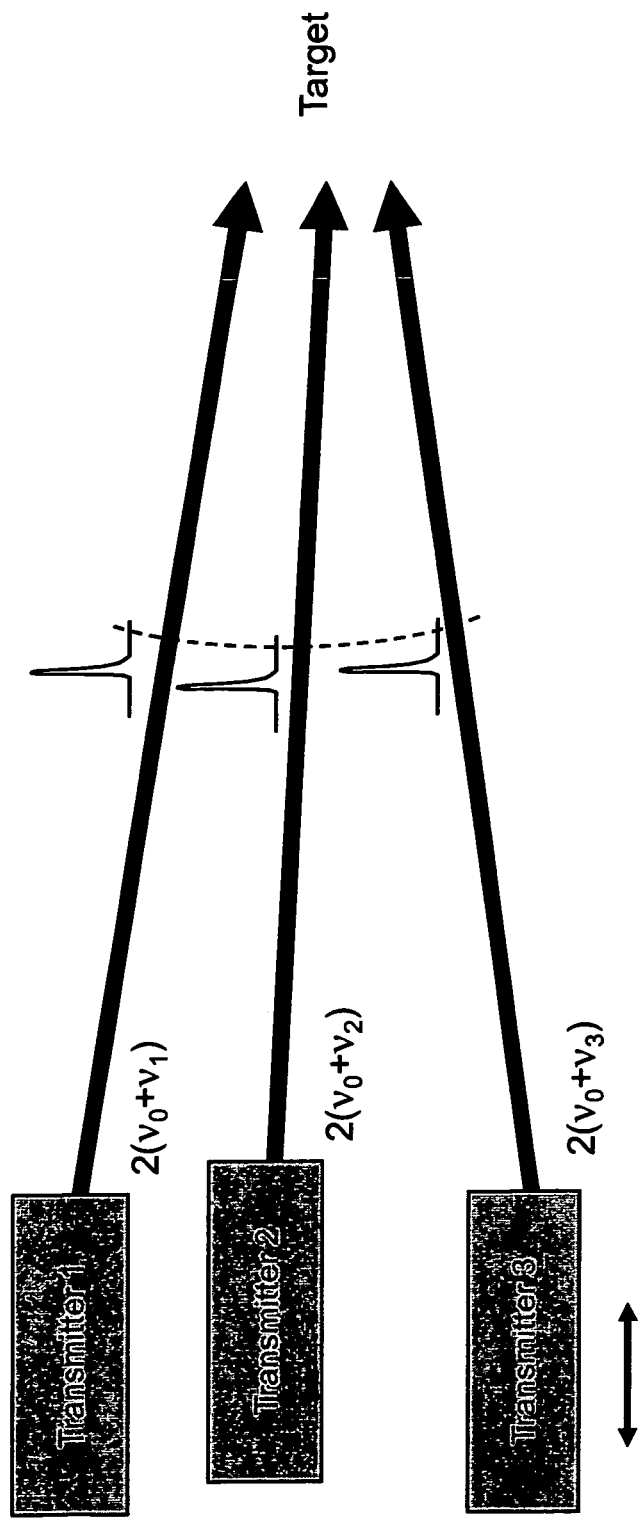
FIG. 8A lists the laser specifications for the super resolution method.
FIG. 8F lists the power amplifier specifications.
FIG. 8G lists the frequency doubling specifications
FIG. 8H shows a frequency doubling concept.
Figure 8H:
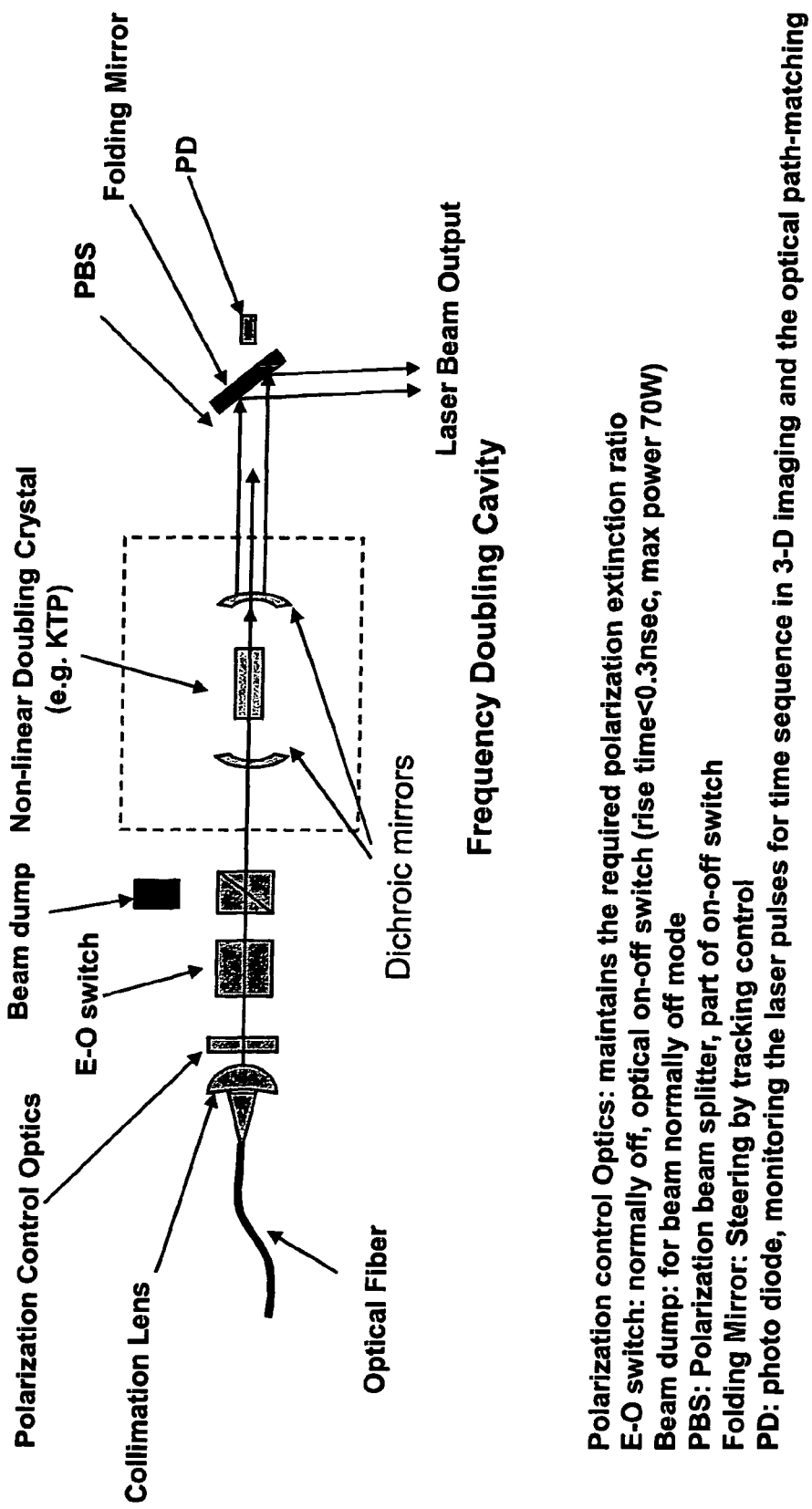

The laser specifications for the laser system is provided in FIG. 8A. FIG. 8B shows how the three laser beams are injected into the AEOS telescope through three holes in the injection mirror. (Note that only two of the three laser beams are shown.) FIG. 8C shows how the three beam are created from the master oscillator. Each of the three beams includes its own frequency encoder, a power amplifier and a frequency doubler. FIG. 8D provides the specifications for the master oscillator. FIG. 8E shows the optical path matching requirements. FIG. 8F shows the specifications for each of the power amplifiers. FIG. 8G shows the specifications for each of the frequency doublers FIG. 8H shows a concept for doubling the frequency of each of the three beams in order to convert the normal output wavelength of the NdYAG laser to a frequency corresponding to a wavelength of about 532 nm as specified in FIG. 8G.

Variations

The reader should understand that the present invention is not limited to the specific embodiments described above and that many modifications and additions or deletions could be made to those described embodiments. For example the invention could be applied to much larger and much smaller telescopes than the ones referred to. It could also be applied to microscopes. New telescopes could incorporate the features of this invention. Other high speed detectors could be used in place of the avalanche photodiode detectors. Larger or smaller pixel arrays should be tailored to specific telescopes. Changes to the specific algorithm described herein are possible. Therefore, the scope of the invention should be determined by the appended claims and their legal equivalents.

What is claimed is:

1. A super-resolution telescope comprising:
   A) a telescope adapted to view a target said telescope defining a telescope aperture;
   B) a target illuminating laser system adapted to produce at least three laser beams positioned in relation to said telescope aperture, each of said at least three laser beams having a slightly different frequency so as to produce an illumination pattern comprised of several sets of straight interference fringes which, when the at least three laser beams are directed at a target, sweep across the target at a predetermined rate and predetermined separation, said fringes defining a set of beat frequencies and defining a highest beat frequency;
   C) receiver detector components defining an array of high speed detectors adapted to monitor and record spatial intensity data at frequencies at least twice the highest beat frequency of the laser light reflected from the target; and
   D) at least one computer processor programmed with a set of algorithms for producing, from the recorded spatial intensity data, images of the target which are better than diffraction limited images corresponding to the telescope aperture.

2. The telescope as in claim 1 wherein the array of high speed detectors is an array of avalanche photodiode detectors.

3. The telescope as in claim 2 wherein the array of avalanche photodiode detectors is an array of at least 30 avalanche photodiode detectors.

4. The telescope as in claim 1 wherein said set of algorithms is adapted to determine phases of the at least three laser beams by comparing data in a spatial frequency overlap region and to combine redundant elements of the target's spatial frequencies in a noise optimized way.

5. The telescope as in claim 1 wherein the target illuminating laser system comprises a laser adapted to provide a series of very short pulses within bursts having durations of less than one millisecond.

6. The telescope as in claim 5 wherein the bursts are in the range of about 250 microseconds and the very short pulses are in the several microsecond range.

7. The telescope as in claim 1 wherein the receiver detector and the algorithm are adapted to record intensity data reflected laser light in successive time bins.

8. The telescope as in claim 7 wherein said algorithm is adapted to provide range information.

9. The telescope as in claim 8 wherein the algorithm is also adapted to provide three-dimension images of the target.

* * * * *